Dec. 14, 1926.

C. C. HANSEN

DOUBLE DRUM HOIST

Filed Sept. 10, 1923

1,611,027

2 Sheets-Sheet 1

INVENTOR
Charles C. Hansen.
BY
Herbert G. Ogden
HIS ATTORNEY

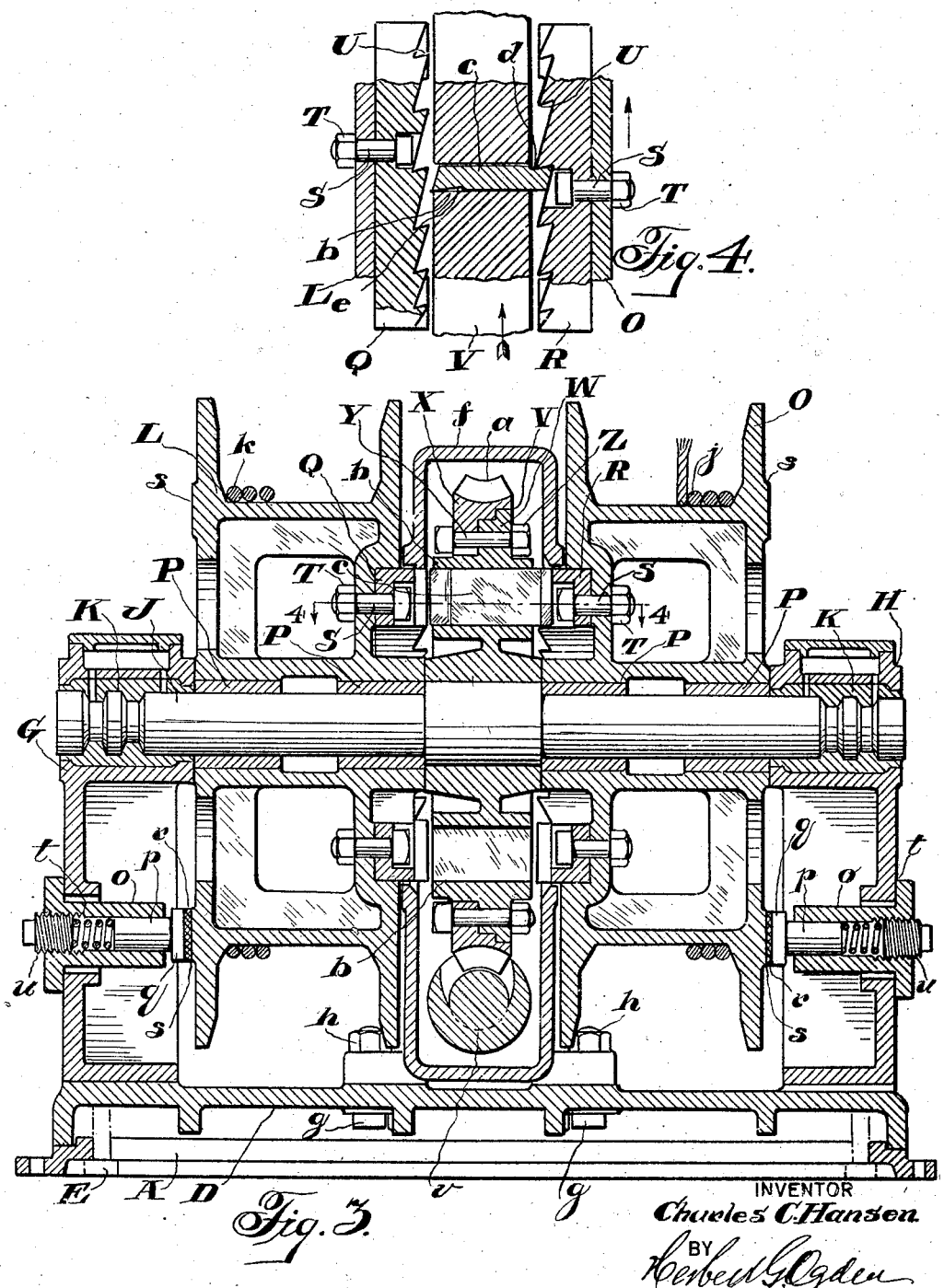

Patented Dec. 14, 1926.

1,611,027

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

DOUBLE-DRUM HOIST.

Application filed September 10, 1923. Serial No. 661,951.

This invention relates to double drum hoists, but more particularly to a clutch mechanism for a double drum hoist for automatically disconnecting one drum and connecting the other drum to the driving means in accordance with the direction of rotation of the driving means.

The main object of the invention is to enable one drum of a double drum hoist to be automatically connected to the driving means, and the other drum automatically disconnected from the driving means, according to the direction of rotation of the driving means by a longitudinally movable clutch mechanism, which is unaffected by gravity or centrifugal force.

Another object of the invention, is to improve on double drum hoists to make them more sturdy and rugged in order to stand up under hard usage, and adapt them for an electric motor drive.

Figure 1:
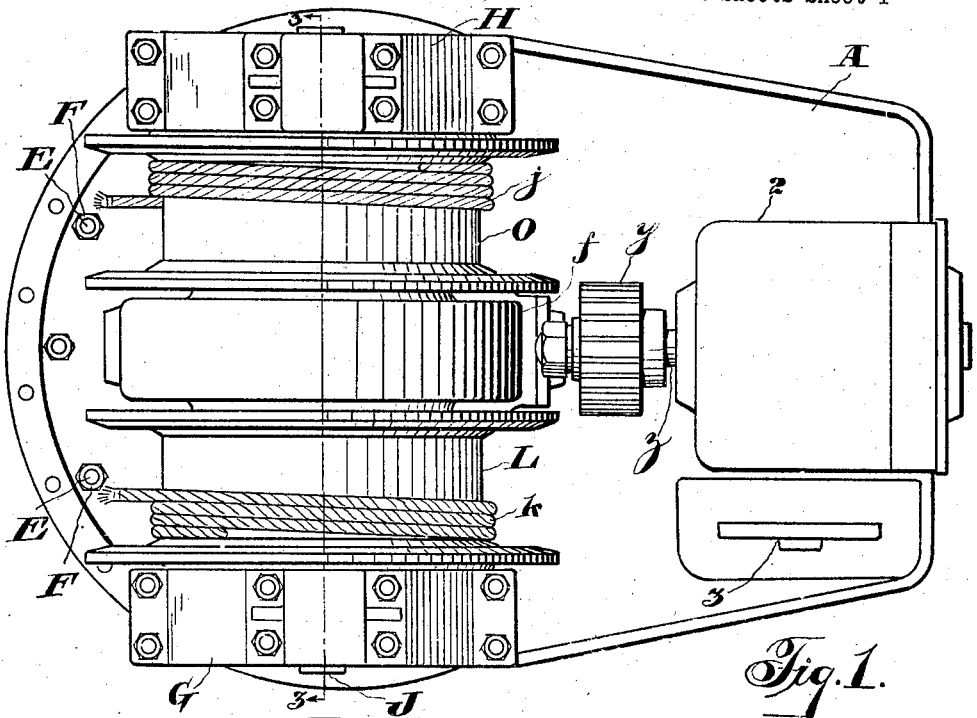
Figure 2:
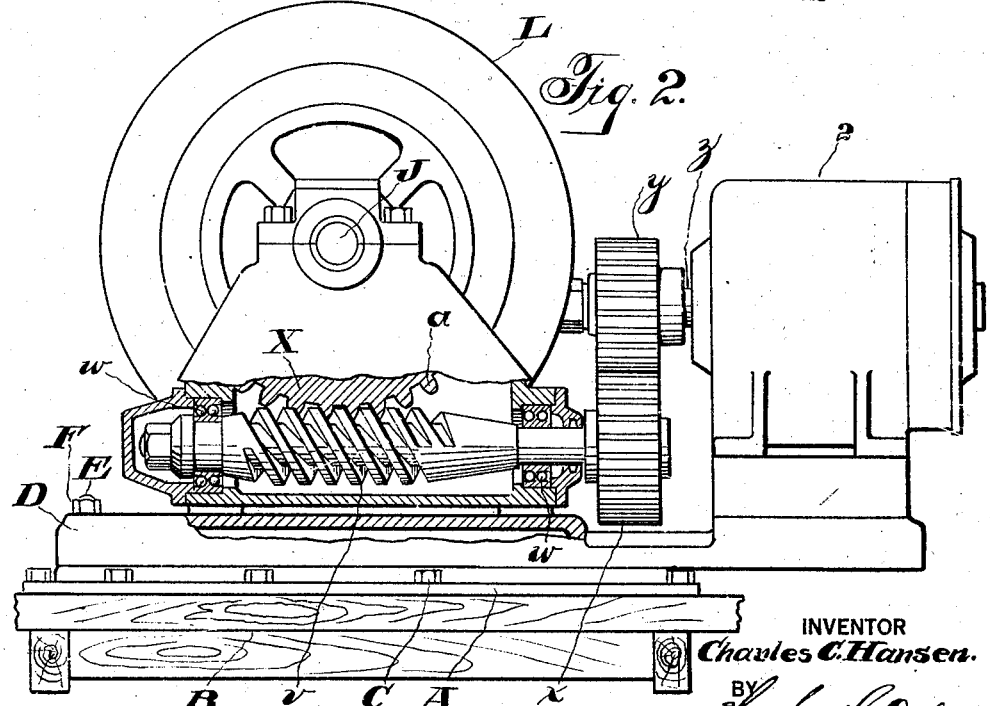

Further objects of the invention will hereinafter appear, and the invention consists of the combination of elements and arrangement of parts described and claimed in this specification and illustrated in the accompanying drawings, in which, Figure 1 is a top plan view of a hoist and electric motor mounted on a common base plate, Figure 2 is a side elevation of the hoist shown in Figure 1 partly in vertical section, Figure 3 is a longitudinal sectional elevation of the hoist taken on the line 3—3 of Figure 1, looking in the direction of the arrows, and Figure 4 is an enlarged detail horizontal sectional view of the clutch mechanism taken on the line 4—4 of Figure 3, looking in the direction of the arrows.

Referring to the drawings, A designates a bed plate suitably secured to the foundation B by bolts C. A base plate D is preferably secured to the bed plate A by the bolts E and the nuts F. A pair of end frames G and H are suitably mounted on the base plate D and a drum shaft J, having suitable bearings K at each end, is shown adapted to rotate in the end frames. Winding drums L and O are rotatably mounted on the drum shaft J and are provided with suitable bushings P. Drum drivers Q and R are in this instance secured respectively to the drums L and O by the bolts S and nuts T, and each of said drivers is formed with oppositely facing teeth U.

A main driver V, in this instance connected to rotate with the drum shaft J, is secured thereto in any suitable manner and is composed of a body portion or disc W and an outer rim X, which are preferably held together by the bolts Y and nuts Z. The rim X is preferably in the form of a worm wheel $a$ and the inner disc W is preferably formed with a plurality of slots $b$, in which longitudinally slidable pawls $c$ are mounted. These pawls are each formed with a cut away portion or groove $d$ at one end and a similar groove $e$ at the opposite end. Any desired number of slots $b$ and pawls may be used, although but one pawl is shown in the drawings. The housing $f$ surrounds the main driver V and is secured to the base D by any suitable means, as by the bolts $g$ and the nuts $h$.

The portions of the teeth U which engage the pawl $c$ are preferably cut back at an angle to the faces of the drum drivers so that the grooves $d$ and $e$ of the pawl will cooperate with the teeth and the pawl will be held in one driving position or the other until the direction of rotation of the main driver is changed.

In the operation of the hoist so far described, let it be assumed that the main driver V is rotated in the direction of the arrow shown in Figure 4. The point of the pawl $c$ is then forced longitudinally in the slot $b$ into contact with a tooth U of the drum driver R, as the other end of the pawl rides over one of the teeth U of the drum driver Q. When the main driver V is rotated in the opposite direction, the pawl $c$ will be moved longitudinally in the slot $b$ so that the opposite point of the pawl will engage one of the teeth U of the drum driver Q, and in this manner one of the drums is automatically connected to the main driver, and the other drum is disconnected therefrom, depending upon the direction of rotation of the main driver V. Ropes $j$ and $k$ are adapted to be wound upon the drums O and L respectively, in such a manner that when one drum is used as the haulage drum and the rope is being wound thereon, the other drum, which becomes the tail rope drum, will feed out the rope, rotating in the same direction.

In order to exert a braking effect on the drums L and O, guide sleeves *o* are secured in any suitable manner in the frames G and H respectively. Plungers *p*, in the guide sleeves each having a head *q*, to which is secured a suitable brake lining *r*, are adapted to bear against the flanges *s* of the drums L and O, and in this instance, coil springs *t*, the tension of which may be adjusted by screws *u* in the sleeve *o*, force the plungers *p* inwardly against the drums. By this means, when the direction of rotation is changed the tail rope drum will quickly be checked and prevented from paying out the rope too rapidly.

In order to rotate the main driver V, a worm *v* suitably mounted in the anti-friction bearings *w*, meshes with the worm wheel *a* of the driver disc W and carries a gear *x* at one end, which meshes with the driving pinion *y* carried by the shaft *z* of an electric motor 2, which is preferably of a reversible type, having a suitable controlling switch 3. Although an electric motor is shown by way of illustration, it is to be understood that any suitable form of driving engine or motor may be employed.

I claim:

1. In a hoist, the combination of a frame, a drum shaft, two drums rotatable about said shaft, opposed drum drivers carried respectively by said drums, a main driver, a reversible motor connected to operate the main driver, and a longitudinally movable pawl carried wholly by the main driver for automatically connecting the main driver with one drum driver or the other according to the direction of rotation of the main driver.

2. In a hoist, the combination of a frame, a drum shaft rotatable in the frame, two drums rotatable about the drum shaft, opposed drum drivers carried respectively by said drums, a main driver rotatable with the drum shaft, a worm wheel located between said drums and operatively connected to the main driver, a worm shaft meshing with said worm wheel, a motor connected to operate the worm shaft, and clutch mechanism carried by the main driver for automatically disconnecting one drum driver and connecting the other drum driver to be driven according to the direction of rotation of the driving shaft.

3. In a hoist, the combination of a frame, a drum shaft, two drums rotatable about the drum shaft, a drum driver carried by each of said drums, a main driver located between said drums, a motor for operating the main driver, a longitudinally movable pawl carried wholly by the main driver for automatically connecting the main driver with one or the other of the drum drivers, according to the rotation of the main driver, and spring pressed brakes constantly exerting a braking force on the drums.

4. A double drum hoist comprising a frame, a drum shaft, two drums rotatably mounted relatively to the drum shaft, a main driver located between the drums, drum drivers carried by the drums, a longitudinally movable pawl slidably carried wholly by said main driver and automatically adjustable into alternate engagement with the drum drivers according to the direction of rotation of the main driver, and a reversible motor operatively connected to drive said main driver.

5. A double drum hoist comprising a frame, a drum shaft, two drums rotatably mounted relatively to the drum shaft, a main driver located between the drums, drum drivers carried by the drums, a longitudinally movable pawl slidably carried wholly by said main driver and automatically adjustable into alternate engagement with the drum drivers according to the direction of rotation of the main driver, and a reversible motor operatively connected to the rim of said main driver for rotating the main driver in one direction or the other.

6. A double drum hoist comprising a frame, a drum shaft, two drums rotatably mounted relatively to the drum shaft, a main driver located between the drums and having a transverse slot in its outer portion remote from the drum shaft, drum drivers carried by the drums, a pawl bodily movable longitudinally and slidably carried wholly by said main driver in said slot, said pawl being automatically adjustable into alternate engagement with the drum drivers according to the direction of rotation of the main driver, and a reversible motor operatively connected to drive said main driver.

7. In combination, a rotatable shaft, a radially disposed driving head rigidly fixed to the shaft and having a transverse slot in its outer portion remote from the said rotatable shaft, winding drums loosely mounted upon the shaft, one upon either side of the driving head, and a pawl bodily reciprocable longitudinally and slidably carried wholly by said main driver in said slot, for alternate engagement with the drums to rotate them in opposite directions.

In testimony whereof I have signed this specification.

CHARLES C. HANSEN.